United States Patent [19]

Mizuguchi et al.

[11] Patent Number: 5,505,804
[45] Date of Patent: Apr. 9, 1996

[54] METHOD OF PRODUCING A CONDENSER LENS SUBSTRATE

[75] Inventors: Yoshihiro Mizuguchi, Tenri; Hiroshj Hamada, Nara, both of Japan

[73] Assignee: Sharp Kabushiki Kaisha, Osaka, Japan

[21] Appl. No.: 362,138

[22] Filed: Dec. 22, 1994

[30] Foreign Application Priority Data

Dec. 24, 1993 [JP] Japan .................................. 5-326428

[51] Int. Cl.⁶ .............................. G02B 5/13; G02B 3/00
[52] U.S. Cl. .......................... 156/154; 65/37; 156/268; 264/2.7; 264/1.21; 359/36; 359/40; 359/619; 359/620
[58] Field of Search ..................................... 156/154, 268; 65/37; 264/1.21, 1.32, 2.7; 359/619, 620, 40, 36; 451/42

[56] References Cited

U.S. PATENT DOCUMENTS

| | | | |
|---|---|---|---|
| 5,225,935 | 7/1993 | Watanabe et al. | 359/619 |
| 5,276,538 | 1/1994 | Monji et al. | 359/40 |

FOREIGN PATENT DOCUMENTS

| | | | |
|---|---|---|---|
| 3-233417 | 10/1991 | Japan . | |
| 3231701 | 10/1991 | Japan | 359/40 |
| 3-248125 | 11/1991 | Japan . | |
| 5-88161 | 4/1993 | Japan . | |
| 5249453 | 9/1993 | Japan | 359/40 |
| 5-273512 | 10/1993 | Japan . | |

*Primary Examiner*—Jeff H. Aftergut

[57] ABSTRACT

In a method of producing a condenser lens substrate, after a first clear substrate and a second clear substrate where a micro-lens having a spherical surface or a lenticular lens is formed are stuck to each other, at least one of the clear substrates is ground. At this time, the clear substrate is ground so as to have a thickness that a focus of the micro-lens or the lenticular lens is positioned in the vicinity of the outer surface of the first or the second clear substrate. This makes it possible to form a micro-lens or a lenticular lens having a short focus in a substrate of a liquid crystal display element. As a result, when a condenser lens substrate is produced, a possibility of breakage of the clear substrate is eliminated, and handling and sticking of clear substrates become easy, thereby making it possible to improve mass-productivity of a condenser lens substrate.

5 Claims, 4 Drawing Sheets

METHOD OF PRODUCING A CONDENSER LENS SUBSTRATE

FIELD OF THE INVENTION

The present invention relates to a method of producing a condenser lens substrate which is used for high-precision liquid crystal display element, etc.

BACKGROUND OF THE INVENTION

Recently, demand for a liquid crystal panel has gotten higher as not only direct-view type but also projection type display element such as projection TV. In the case where a liquid crystal display panel is used as the projection type display element, as an enlargement ratio is raised by using a constant number of picture elements, roughness of a picture becomes more noticeable. In order to obtain a precise image even at a high enlargement ratio, it is necessary to increase a number of picture elements.

However, if a number of picture elements of a liquid crystal panel is increased, especially in an active matrix type liquid crystal, an area of parts other than picture elements becomes relatively large, and an area of a black matrix which covers the above portion is increased. As a result, an area of the picture element which contributes to display is decreased, so an aperture ratio of the display elements drops. If a drop in the aperture ratio occurs, a picture becomes dark, thereby deteriorating quality of an image.

In order to prevent such a drop in an aperture ratio due to increase in a number of picture elements, Japanese Unexamined Patent Publications No. 60-165621, 165622, 165623, 165624, 262131/1985 (Tokukaisho 60-165621, 165622, 165623, 165624, 262131) disclose that micro-lens array is formed on one surface of a liquid crystal panel, for example. The micro-lens array shown here has micro-lenses corresponding to each picture element and condenses a light, which is conventionally blocked off by a black matrix into picture elements.

In addition to the above application, the micro-lenses are used in combination with the following means:

(1) condensing means of an optical pick-up, such as a laser disk, compact disk, magneto-optical disk;

(2) condensing means for combining an optical fiber with a light emitting element or a light receiving element;

(3) condensing means or image forming means for condensing an incident light to a photoelectric converting area so as to improve sensitivity of a solid image pickup element such as a CCD, or a one-dimensional image sensor which is used for a facsimile (for example, Japanese Unexamined Patent Publication 54-17620/1979 (Tokukaisho 54-17620), Japanese Unexamined Patent Publication 57-9180/1982 (Tokukaisho 57-9180);

(4) image forming means for forming an image to be printed on a photoreceptor in a liquid crystal printer or an LED printer (for example, Japanese Unexamined Patent Publication 63-44624/1988 (Tokukaisho 63-44624); and (5) various optical elements or optical parts, etc. in an optical apparatus such as optical information processing filter.

As to such a method of producing a micro-lens, an ion exchange method (Appl. Optics, 21(6) p. 1052(1982), Electron Lett., 17 p. 452 (1981)), a swelling method (Suzuki and others "New Method of Producing a Plastic Micro-lens" 24th Institute of Micro-Optics), a heat sagging method (Zoran D. Popovic et al., Appl. Optics, 27 p. 1281 (1988)), machining method, etc. can be used.

In the ion exchange method, a plain type micro-lens array having a refractive index distribution type micro-lens can be obtained, and in the other methods, micro-lens array having a convex micro-lens can be obtained. In the case of especially the convex micro-lens array, as disclosed in Japanese Unexamined Patent Publication 5-134103/1993 (Tokukaihei 5-134103), a metal mold is produced by using the convex micro-lens array as a master, mass production of the micro-lens array is possible by using a method of molding a photosensitive resin by means of the metal mold (Photo Polymer method=2P method). An effective aperture ratio is improved by sticking the micro-lens array obtained by the above method to a liquid crystal panel, thereby obtaining a bright display picture.

In a liquid crystal panel which is used for projection TV which displays a high-precision picture at a picture element pitch of dozens µm, an area of a picture element aperture is smaller compared to a liquid crystal panel in which the picture elements pitch is several hundred µm. Since the effective aperture ratio is determined based upon a relationship between a size of the light spot of the micro-lens and the area of picture element aperture, the size of the light spot of the micro-lens, which is used for the liquid crystal panel having the picture element pitch of dozens µm, should be smaller than that of the liquid crystal panel having the picture element pitch of several hundred µm. This is because if the size of the light spot of the micro-lens is bigger than the area of the picture element aperture, a light which does not enter the picture element aperture cannot contribute to display, thereby lowering improvement of the effective aperture ratio by the micro-lens.

A relationship $D=2 \cdot f \cdot \tan\theta$ holds, wherein D is a diameter of the light spot, $\theta$ is the extent of the incident light angle (half width), f is the focal length of a micro-lens. In order to decrease the area of the light spot of a micro-lens, namely, improve an effect of condensing, it is considered that the extent of the incident light angle $\theta$ or the focal length of a micro-lens is shortened according to the above formula.

In order to decrease the extent of the incident light angle $\theta$, a light emitting area of a light source to be used is decrease and a distance from the light source to a panel is increased. However, it is hard to decrease the extent of the incident light angle $\theta$ to several degrees in order to secure a long service life and brightness required for display at a current technical level of the light source. Therefore, it is necessary to shorten the focal length of a micro-lens and position its focus in the vicinity of a picture element aperture of a liquid crystal panel (hereinafter, referred to as a short focus technique).

A panel in which a pitch of picture elements is 50 µm and one side of a picture element aperture is about 30 µm is produced by a current method of producing a liquid crystal panel. If an extent of an illumination light $\theta$ is 5°, in order to restrict the diameter of the light spot D to not more than 30 µm, the focal length f should be not more than 170 µm according to the above formula: $D=2 \cdot f \cdot \tan v$. Meanwhile, since an amount of condensing of a light by a micro-lens is proportional to an area of the micro-lens, the amount of condensing of a light by the micro-lens becomes maximum in a state that the micro-lenses spreads all over at a same pitch as that of the picture elements, namely, when the diameter of the micro-lens is equal to the pitch of the picture elements. A numerical aperture (N.A.) of the micro-lens at this time becomes 0.147 according to $N.A.=P/2 \cdot f$. Therefore, in a high-precision liquid crystal panel in which a picture element pitch is dozens μm, it is desirable that a value of numerical aperture for decreasing the light spot of a micro-lens is at least not less than 0.1.

Incidentally, in the above-mentioned micro-lens, cover glass with a thickness of 250 μm which is applicable to a focal length in the air 170 μm (a value obtained by multiplying a refractive index of glass and the focal length in the air) are put between the micro-lenses, and the focus should be positioned in the picture element aperture of the liquid crystal panel. In order to accomplish the above arrangement, a liquid crystal panel is produced such that the cover glass substrate with a thickness of 250 μm is used as one of the substrates, and the micro-lens is stuck to the liquid crystal panel. However, this method makes it difficult to handle the cover glass substrate, so it is not unsuitable for mass production.

Japanese Unexamined Patent Publication 3-248125/1991 (Tokukaihei 3-248125) discloses a short focus technique of a micro-lens instead of the above method. In this method, a cover glass or film with a same thickness as a focal length is adhered to the surface of a micro-lens, and the micro-lens is produced in one substrate of a liquid crystal display element.

In addition, Japanese Unexamined Patent Publication 3-233417/1991 (Tokukaihei 3-233417) disclosed a method that a lens section is formed using a photosensitive resin by the 2P method and cover glass having a same thermal expansion coefficient as that of the micro-lens substrate is adhered to the lens section by adhesive having a different refractive index from that of the photosensitive resin so that mass productivity and adhesion are improved.

However, these prior arts causes the following problems because thin cover glass of 200 μm to 300 μm is used from the first.

First, when a cover glass is produced, since it is thin and very fragile, it is difficult to mass-produce the cover glass with a wide area at an excellent yield.

In addition, if cover glass is produced, a careful packing method is required in order to prevent damage during transportation.

Next, at the stage that a cover glass is stuck to a micro-lens, careful handling is required so as to prevent breakage of a cover glass. Moreover, in order to stick a cover glass to a micro-lens so as to have an uniform thickness, the cover glass should be pressed while the whole substrate is being uniformly loaded, but if even a slight flexing occurs, the cover glass breaks in its flexed place.

In addition, generally, in order to improve mass productivity, a plurality of liquid crystal display elements are taken out from one big glass substrate. Therefore, a plurality of micro-lenses are arranged on one glass substrate correspondingly to the liquid crystal display elements. A substrate for taking out a plurality of liquid crystal display elements to which such a micro-lens substrate is stuck is produced, and the liquid crystal display elements are cut one by one. However, since this substrate has an arrangement that three glass substrates are stacked up, in the case where the liquid crystal display elements are cut one by one, only glass on the outside can be cut along a prescribed line by a conventional cutting method. Therefore, the cover glass on the inside is not cut and is left, so the liquid crystal display elements cannot be cut one by one. Furthermore, when cutting, excessive force is applied to the cover glass, thereby arising a problem that the cover glass is liable to break, etc.

SUMMARY OF THE INVENTION

It is an object of the present invention to provide a condenser lens substrate having excellent mass-productivity, a short focal length and a high effect of condensing.

In order to achieve the object, a method of a condenser lens substrate of the present invention, includes:

a first step of forming a condenser lens having a curved surface on a first clear substrate;

a second step of sticking the first clear substrate to a second clear substrate putting the condenser lens between them; and a third step of lapping at least one of the first clear substrate and the second clear substrate so that a focus of the condenser lens comes to the vicinity of an outer surface of the first or second clear substrate so as to adjust a thickness of one of the clear substrates which are stuck.

In the above producing method, a condenser lens with a short focal length can be formed in a substrate of a liquid crystal display element by lapping at least one of the first and the second clear substrates, which are stuck so as to be opposed to each other across the condenser lens. As a result, when a condenser lens substrate is produced, there is no possibility of breakage of the clear substrate. This makes it easy to handle and stick the clear substrates, thereby making it possible to improve mass-productivity.

In addition, in the above producing method, the first or second clear substrate is preferably ground so that the focal surface of the condenser lens is positioned within 1/10 of the focal length of the condenser lens from the outer surface of at least one of the clear substrates, thereby heightening the effect of condensing by the condenser lens within the above range. For this reason, an effective aperture ratio of a liquid crystal display element using the condenser lens substrate can be kept constant.

Furthermore, in the above producing method, after the third step (the step of lapping), a cut line is formed on the first or second clear substrate so that the first or second clear substrate can be separated into a desired configuration. As a result, when the liquid crystal display elements taken out plurally, which is arranged such that the condenser lens substrate is stuck to an active matrix substrate as a counter substrate, deep dicing for cutting the inner clear substrate is not carried out, and the outer substrate is simply scribed. This makes the process of cutting simple, thereby making it possible to carry out cutting process rapidly.

Here, the desired configuration is a configuration which satisfies a desired method of arranging the condenser lens, a size of a liquid crystal display area, etc., and it means a configuration of one panel of the liquid crystal display elements taken out plurally from one substrate.

In addition, in the above producing method, as a spherical condenser lens to be formed in the first step, a micro-lens or a lenticular lens is suitable.

For a fuller understanding of the nature and advantages of the invention, reference should be made to the ensuing detailed description taken in conjunction with the accompanying drawings.

DESCRIPTION OF THE EMBODIMENTS

Embodiment 1

Figure 1:
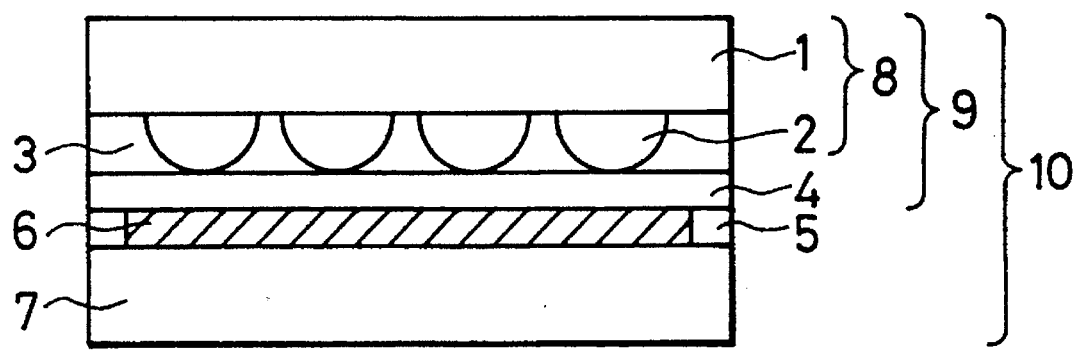
FIG. 1 is a cross section which shows an arrangement of a liquid crystal display element in which a micro-lens substrate of one embodiment of the present invention is used.
Figure 2:
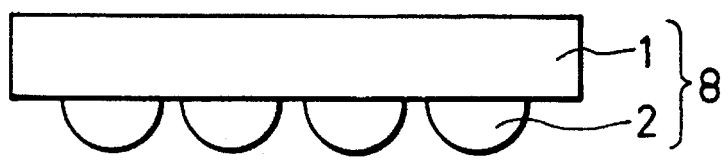
FIG. 2(a) through FIG. 2(d) are cross sections which shows micro-lens array and micro-lens substrates which are produced in each process when a micro-lens substrate of one embodiment of the present invention is produced.
Figure 2:
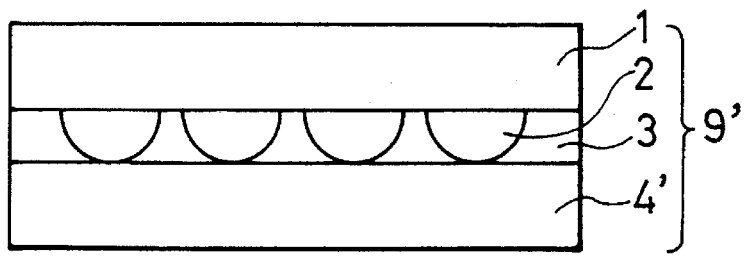
Figure 2:
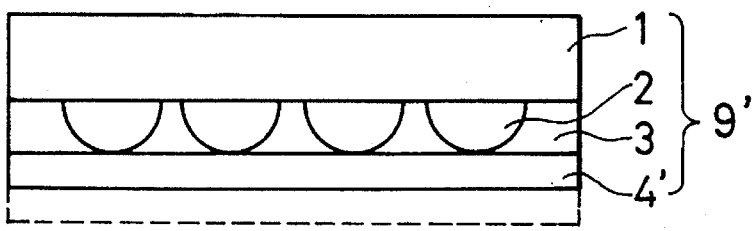
Figure 2:
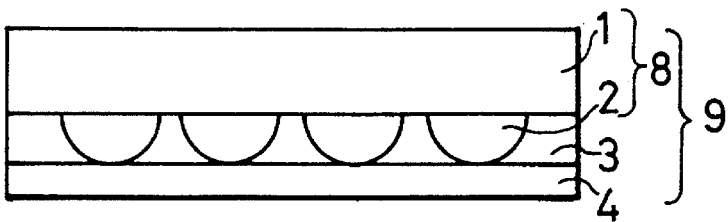
Figure 3A:
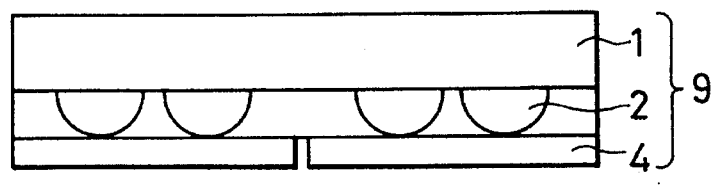
FIGS. 3(a) through FIG. 3(d) are cross sections which shows produced intermediate products and a finished liquid crystal display element in each process when a liquid crystal display element, in which a micro-lens substrate of one embodiment of the present invention is used, is produced.
Figure 3B:
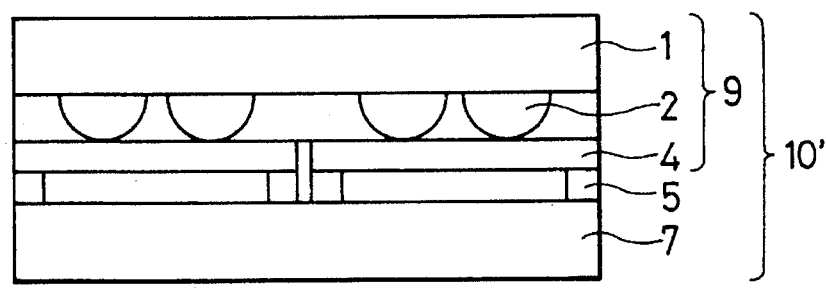
Figure 3C:
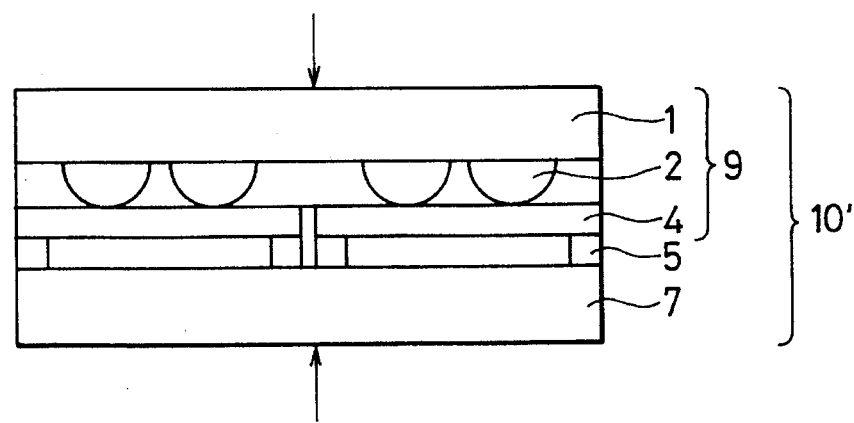
Figure 3D:
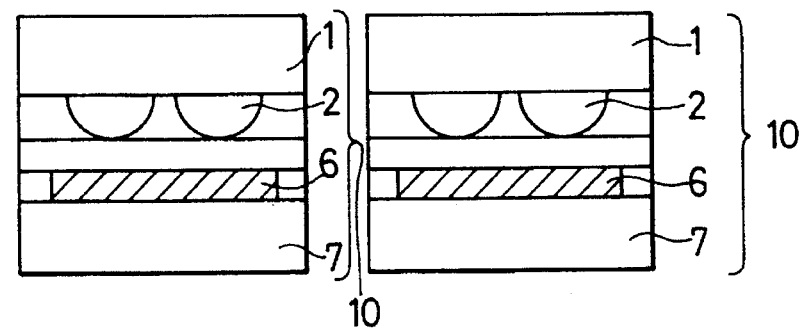

The following will discuss one embodiment of the present invention referring to FIGS. 1 through 3.

FIG. 1 shows a cross section of an active matrix-type liquid crystal display element using a micro-lens substrate of the present invention. In the active matrix-type liquid display element, an alignment film, a picture element electrode, a switching element, a bus wiring, etc. (not shown) are formed on a clear substrate 7 composed of quartz glass, and after they are adhered to a counter substrate 9 by a sealant 5, liquid crystal is injected thereto and sealed so that a liquid crystal layer 6 is formed. The counter substrate 9 is composed of micro-lens array 8, an adhesive layer 3 and quartz cover glass 4, and in the micro-lens array 8, a micro-lens 2 is formed on a quartz substrate 1 correspondingly to each picture element electrode on the clear substrate 7. The micro-lens 2 has a convex lens configuration and is produced by the above-mentioned 2P method. Moreover, a transference electrode, a black matrix and an alignment film, not shown, are formed on the surface of the liquid crystal layer 6 side of the quartz cover glass 4.

Next, the following will discuss a method of producing the micro-lens substrate 9 which is used as a counter substrate of a liquid crystal display element according to each step shown in FIG. 2(a) through FIG. 2(d).

(a) First, the convex micro-lens 2 is formed on one surface of the quartz substrate 1 by using the 2P method so that the micro-lens array 8 is produced.

In the present embodiment, a photosensitive resin UV-4000 (refractive index=1.567) made by Daikin Industries, Ltd. is used as a material of the micro-lens 2, and a hemispherical (spherical) micro-lens having a center curvature diameter of 15.6 μm is formed on the quartz glass substrate 1 according to a picture element pitch of 29 μm×24 μm.

(b) Next, a clear substrate 4' which becomes cover glass is adhered to the surface of the micro-lens 2 by using the clear adhesive 3 so that a micro-lens substrate 9' in which the micro-lens 2 is made is produced. Here, a photosensitive resin UV-1000 (refractive index=1.453) made by Daikin Industries, Ltd. was used as a material of the adhesive 3, and a quartz glass substrate of 0.625 mm which is the standard product is used as the clear substrate 4'.

(c) Next, the clear substrate 4' is ground until its thickness becomes from 0.625 mm to a target value 0.2 mm. At this time, care must be taken in inclination of the clear substrate 4' so that the whole thickness of the clear substrate 4' is uniform.

The target value 0.2 mm of the thickness of the clear substrate 4' can be set as follows. Since a focal length in the air is 0.137 mm and a refractive index of the quartz glass is 1.46, the focal length in the quartz glass is obtained as 0.2 mm by multiplying the refractive index of the quartz glass (1.46) and the focal length in the air (0.137 mm). A size of a light spot by a micro-lens seldom changes within ±1/10 of the focal length. In other words, if lapping is done so that the surface of the cover glass, on which the black matrix is formed by a later process, is within the above range, an effective aperture ratio can be kept constant irrespective of the thickness of the cover glass. In embodiment 1, the thickness of the cover glass is within 0.2±0.02 mm.

(d) Moreover, the clear substrate 4' which has been ground is cleaned with an organic solvent or water, etc. and is dried. Thereafter, the micro-lens substrate 9 where the thin quartz cover glass 4 is stuck to the surface of the micro-lens array 8 is finally obtained.

Here, in the above process, a method for lapping only one substrate 4' of the micro-lens substrate 9' is used, but the micro-lens substrate can be produced also by a double side lapping method for lapping the both sides of the substrate for a same thickness. In this case, as the substrate 1 on which the micro-lens is formed, a substrate with an anticipated thickness for double-side lapping is used.

In addition, same materials are used for the glass substrates 1, 4 and 7. This prevents peeling of the micro-lens and the substrate due to a difference in a thermal expansion coefficient.

From a viewpoint of productivity, ultraviolet ray photosensitive resin is preferred to a thermosetting resin as materials of the micro-lens 2 and the adhesive 3.

The micro-lens substrate 9 corresponding to the micro-lens 2 with a short focal length can be produced by the above method without using thin cover glass. Such a method of producing the micro-lens substrate decreases faults in the process, thereby making it possible to mass-produce the micro-lens substrate with a high yield.

Here, the above discussed a hemispherical micro-lens, but this micro-lens includes a kind of a lenticular lens, so it can be applied to all kinds of condenser lenses.

Next, referring to FIG. 3(a) through FIG. 3(d), the following will discuss the processes for finishing a liquid crystal display element such that the micro-lens substrate as a counter substrate is stuck to an active matrix substrate so as to produce a liquid crystal display element, the liquid crystal display element is cut into pieces and liquid crystal is injected thereto.

(a) A layer of the quartz cover glass 4 of the micro-lens substrate 9 which has been produced by a method in FIG. 2(a) through FIG. 2(d) is diced along a prescribed cut line. At this time, a depth of the cut line is controlled so that the quartz substrate 1 which is not used as a counter substrate of the liquid crystal display element is not cut. Moreover, the cut line is determined according to a size, a configuration, an arrangement and a required area of the micro-lens.

(b) Next, after a black matrix, a clear substrate and an alignment film are formed on the surface of the cut quartz cover glass 4, the clear substrate 7 is stuck thereto through the sealant 5 so that a substrate 10', mentioned later, from which a plurality of liquid crystal display elements 10 are taken out is produced.

(c) Further, after a line is scribed in the clear substrates 1 and 7 on the outer side so that the liquid crystal display elements 10 can be taken out one by one, they are cut. At this time, the quartz cover glass 4 is simultaneously cut. As to another cutting method, a method for dicing from the both sides, etc. is also used.

(d) Finally, liquid crystal 6 is injected into the cut substrate 10' so that the liquid crystal display elements 10 are completed.

The above method eliminates a problem that the interior clear substrate is not cut and remained when a substrate from which a plurality of liquid crystal display elements are taken out composed by sticking the micro-lens substrate 9 as a counter substrate to the active matrix substrate, so deep dicing from the outer substrate is not required.

In addition, a diameter of the light spot is decreased by adopting the micro-lens substrate 9 to the liquid crystal display element 10, thereby improving the effective aperture ratio of the liquid crystal display element 10.

Embodiment 2

Figure 4:
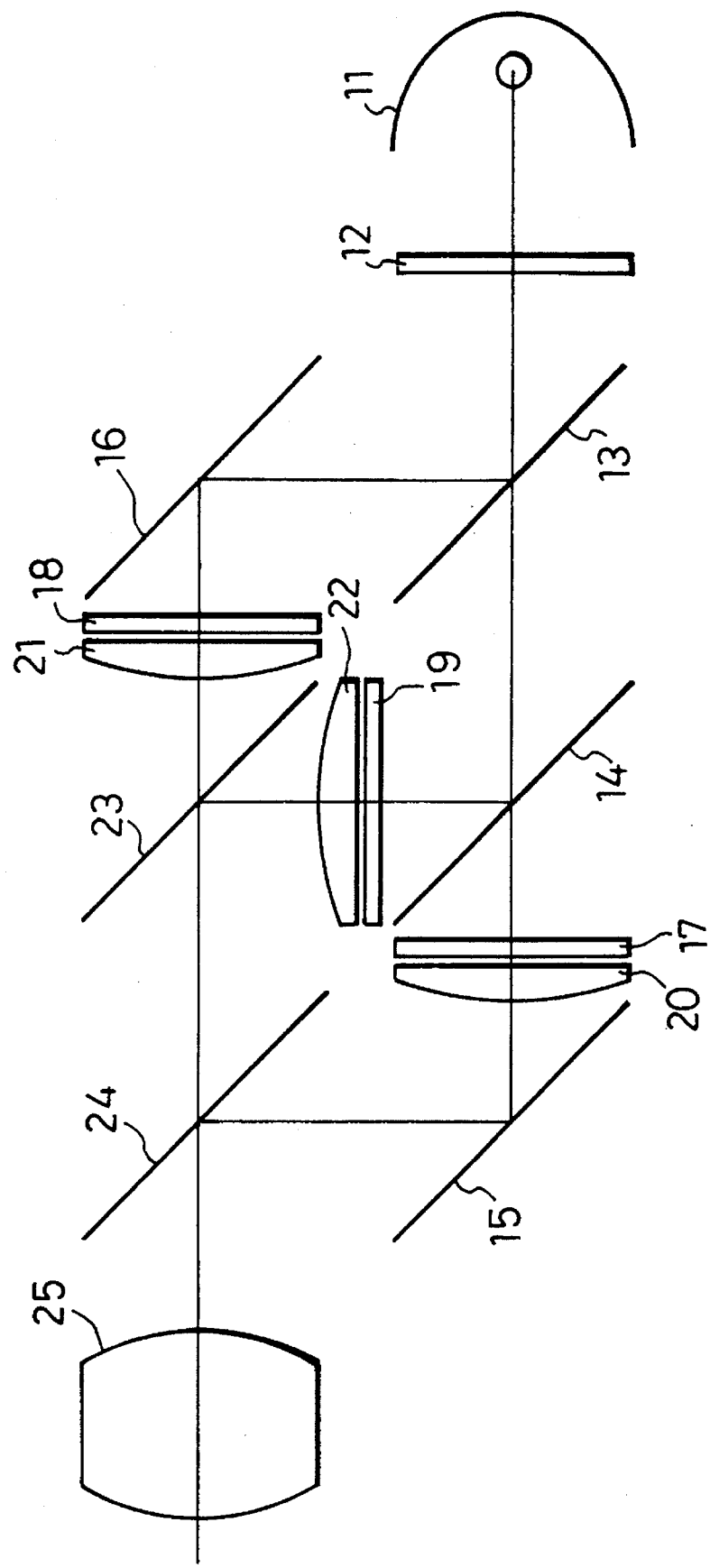
FIG. 4 is an explanatory drawing which shows an arrangement of an optical system in a liquid crystal projector of another embodiment of the present invention.

The following will discuss another embodiment of the present invention referring to FIG. 4. Here, for convenience of explanation, those members that have the same arrangement and functions, and that are described in the aforementioned embodiment are indicated by the same reference numerals and the description thereof is omitted.

FIG. 4 shows an optical system of a liquid crystal projector which adopts a liquid crystal display element using a micro-lens substrate of the present invention. This optical system includes a white light source 11, an UV-IR filter 12, dichroic mirrors 13.14, reflecting mirrors 15.16, liquid crystal display elements 17 through 19, field lenses 20 through 22, dichroic mirrors 23 and 24, and a projecting lens 25. The liquid crystal display elements 17 through 19 have a micro-lens substrate of the present invention and displays each primary colour based upon an image signal. The micro-lens substrate is produced by the method of producing the embodiment 1.

The UV-IR filter 12, the dichroic mirrors 13.14, the the liquid crystal display element 17, the field lens 20 and the reflecting mirror 15 are arranged on an optical path of a light emitted from the white light source 11 in the order of being closer to the white light source 11. Moreover, the reflecting mirror 16, the liquid crystal display element 18, the field lens 21, and the dichroic mirrors 23.24 are arranged on an optical path of a light which enters the projecting lens 25 in the order of being farther from the projecting lens 25. Furthermore, the liquid crystal display element 19 and the field lens 22 are arranged between the dichroic mirrors 14.23.

In the above optical system, after a light emitted from the white light source 11 such as a halide lamp passes through the UV-IR filter 12, the light is resolved into the three primary colours: red, green and blue by the dichroic mirrors 13.14. Each primary colour becomes each primary colour image in different optical paths based upon an image signal as follows.

First, a red light, which has been separated by the dichroic mirror 13, is reflected by the reflecting mirror 16 and becomes a red image in the liquid crystal display element 18. Thereafter, the red image passes through the field lens 22 and passes through the dichroic mirrors 23.24. Moreover, a green light, which has passed through the dichroic mirror 13 and been separated by the dichroic mirror 14, becomes a green image in the liquid crystal display element 19 and passes through the field lens 22. Thereafter, the the green image is reflected by the dichroic mirror 23 and passes through the dichroic mirror 24. Further, after a blue light, which has passed through the dichroic mirrors 13.14, becomes a blue image in the liquid crystal display element 17 and passes through the field lens 20, the blue image is reflected by the reflecting mirror 15 and the dichroic mirror 24. When respective images having respective primary colours are led from the dichroic mirror 24 to the projecting lens 25, they are formed as one colour image by the projecting lens 25.

In the liquid crystal projector adopting the micro-lens substrate of the present invention, micro-lenses with a short focal length are installed to the respective picture elements according to reduction (high-fining) in a picture element size of the liquid crystal display element. As a result, in a conventional high-precision liquid crystal display element, a light which is blocked off by a black matrix is condensed to an picture element aperture without a waste by the above-mentioned micro-lens, thereby obtaining a bright display picture.

Here, after the light condensed by the micro-lens forms a spot, the light reaches the projecting lens 25 while being emitted from the picture element aperture at an angle which is determined according to a numerical aperture (divergent angle). In order that the projection lens 25 covers the emitted light, it is desirable that a focal length f of the projecting lens 25 is short and a diameter D of the projecting lens 25 is as big as possible. Concretely, it is a condition that a value D/2f which is a numerical aperture of the projecting lens 25 is larger than that of the micro-lens. Therefore, according to the condition of a numerical aperture of the micro-lens, if the projecting lens 25 having a numerical aperture of not less than 0.1 is used, loss of light can be reduced, thereby obtaining a bright picture on a screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing a condenser lens substrate, comprising:

a first step of forming a condenser lens having a curved surface on a first clear substrate;

a second step of sticking the first clear substrate to a second clear substrate putting the condenser lens between them; and a third step of lapping at least one of the first clear substrate and the second clear substrate so that a focus of the condenser lens is positioned in the vicinity of an outer surface of the first or second clear substrate so as to adjust a thickness of one of the clear substrates which are stuck.

2. The method of producing a condenser lens substrate as defined in claim 1, wherein in said third step an amount of lapping is set so that a focal surface of the condenser lens is positioned within 1/10 of a focal length of the condenser lens from the outer surface of at least one of the two clear substrates.

3. A method of producing a condenser lens substrate as defined in claim 1, further comprising a fourth step of forming a cut line on the first or second clear substrate positioned on the focal surface of the condenser lens so that the first or second substrate can be cut into a desired configuration.

4. The method of producing a condenser lens substrate as defined in claim 1, wherein in said first step a micro-lens is formed as a condenser lens.

5. The method of producing a condenser lens substrate as defined in claim 1, wherein in said first step, a lenticular lens is formed as a condenser lens.

* * * * *